United States Patent [19]

Donatelli et al.

[11] Patent Number: 5,563,197
[45] Date of Patent: Oct. 8, 1996

[54] STORAGE STABLE DIPSERSIONS OF FINELY DIVIDED SOLIDS IN ORGANOSILOXANE COMPOSITIONS

[75] Inventors: Joan M. Donatelli; Daniel F. McMahon, both of Midland, Mich.

[73] Assignee: Dow Corning Corporation, Midland, Mich.

[21] Appl. No.: 510,247

[22] Filed: Aug. 2, 1995

[51] Int. Cl.⁶ .................................................. C08K 5/54
[52] U.S. Cl. .......................... 524/267; 524/731; 524/781; 524/783; 524/785; 524/787; 524/788; 524/779; 524/780; 524/431; 524/433; 524/430; 524/434; 524/414; 524/418; 524/436
[58] Field of Search ..................................... 524/267, 731, 524/431, 433, 430, 436, 434, 418, 414, 781, 783, 785, 787, 788, 780, 779

[56] References Cited

U.S. PATENT DOCUMENTS

| | | | |
|---|---|---|---|
| 4,520,173 | 5/1985 | Fink et al. ............................ | 524/267 |
| 4,926,673 | 5/1990 | Laurent et al. ....................... | 524/731 |
| 5,006,597 | 4/1991 | Luecke et al. ....................... | 524/556 |
| 5,036,121 | 7/1991 | Coaker et al. ....................... | 524/100 |

FOREIGN PATENT DOCUMENTS 04110302  4/1992  Japan .

*Primary Examiner*—Melvyn I. Marquis
*Attorney, Agent, or Firm*—Robert Spector

[57] ABSTRACT

A stable dispersion of a finely divided solid such as a pigment in an organosiloxane composition can be prepared as a homogeneous thixotropic liquid, paste or gel by blending the solid with a finely divided, partially treated silica, a specified class of liquid diorganosiloxane/oxyalkylene copolymers and, as a diluent, at least one liquid organosiloxane oligomer having a density lower than the density of the dispersed solid. The gels and pastes convert to flowable liquids when subjected to shearing forces.

9 Claims, No Drawings

STORAGE STABLE DIPSERSIONS OF FINELY DIVIDED SOLIDS IN ORGANOSILOXANE COMPOSITIONS

BACKGROUND OF THE INVENTION

1. Field of the Invention

This invention relates to organosiloxane compositions containing a uniformly dispersed solid phase. More particularly, this invention relates to organosiloxane compositions containing a thixotropic matrix in the form of a liquid, paste or gel and a suspended solid phase that does not precipitate during storage of the compositions for extended periods of time. When subjected to shearing forces the matrices in the form of pastes and gels convert to flowable liquids.

2. Background Information

One of the problems associated with low viscosity organosiloxane compositions containing pigments or other insoluble solid materials having a higher density than that of the liquid phase is the tendency of the solid phase to settle during storage of the compositions. When the solid is a pigment and compositions are fabricated into shaped articles by molding or extrusion the tendency of the pigment to separate can result in uneven coloration of the final product.

The prior art discloses a variety of additives yielding stable dispersions of pigments and other solids in liquid compositions.

The use of colloidal silica as a pigment dispersant in latex compositions is described in Japanese Laid Open Patent Application No. 4/110,302. In accordance with the teaching of this patent, a polymer emulsion with a glass transition temperature of up to 0° C. is blended with from 0.5 to 10 weight percent of colloidal silica. A mixture of an unsaturated organic monomer and a vinyl-functional silane is then polymerized in the presence of the emulsion. The resultant composition is used as a pigment dispersion vehicle.

U.S. Pat. No. 5,006,597 describes a storage stable water-based black corrosion resistant top coat containing from 1 to 40 weight percent of an aqueous silica sol and at least 0.2 weight percent of amorphous silica.

Commonly assigned U.S. Pat. No. 5,036,121, which issued to Alan Himstedt on Jul. 30, 1991 describes moisture curable thixotropic dispersions containing a hydroxyl-terminated polydimethylsiloxane, a moisture-activated crosslinking agent for this polymer, a catalyst for the crosslinking reaction, a hydrated aluminum oxide and, as the thixotropic agent, a mixture of an untreated silica and a hydroxyl-terminated polydiorganosiloxane wherein at least a portion of the silicon-bonded hydrocarbon radicals are phenyl or 3,3,3-trifluoropropyl.

Thixotropic agents that have been used in curable organosiloxane compositions include silica treated with various organosilicon compounds and organosiloxane/oxyalkylene copolymers.

To achieve adequate storage stability some curable organosiloxane compositions, particularly those containing tin compounds as the catalysts for the crosslinking or curing reaction, are packaged with the tin compound and crosslinkable polyorganosiloxane in separate containers. The crosslinking agent is typically packaged together with the curing catalyst.

Because only a small volume of crosslinking agent relative to the volume of crosslinkable polyorganosiloxane is required to achieve the desired degree of crosslinking, the portion of the composition containing the crosslinking agent typically contains a quantity of diluent that will allow this part of the composition to be blended with the part containing the crosslinkable polyorganosiloxane in a volume ratio of 1 part of curing agent portion to up to about 20 parts of the portion containing the crosslinkable polyorganosiloxane. The diluent is a solvent for the crosslinking agent and the catalyst.

Commonly assigned U.S. patent application Ser. No. 08/401,104, filed on Mar. 8, 1995 and now abandoned, describes two-part, moisture curable organosiloxane compositions. The portion of these compositions containing the crosslinking agent and curing catalyst is thixotropic and comprises, in addition to the crosslinking agent and catalyst, a specified class of liquid diorganosiloxane/oxyalkylene copolymers as the thixotropic agent together with a specified class of non-reactive organosiloxane oligomers containing silicon-bonded phenyl radicals as a diluent. The examples in this application describe preparation of the thixotropic portion of the two-part composition by combining all of the ingredients of this portion together, blending these ingredients to homogeneity and combining the resultant mixture with the other ingredients of the curable composition.

It was subsequently found that when prepared as described in the examples of the aforementioned application, the thixotropic portion of the two-part composition separated into a very soft gelatinous material and a supernatant liquid. When this two-phase thixotropic portion contained a pigment that had a higher density than the density of the liquid, a portion of the pigment settled to the bottom of the liquid phase.

When the pigmented portion containing the catalyst was combined with the base portion comprising a crosslinkable liquid polyorganosiloxane and fillers, the pigment could not be homogeneously blended into the resultant mixture to form a uniformly pigmented, homogeneous composition.

One objective of this invention is to provide uniform dispersions of finely divided solids, including but not limited to pigments, in low molecular weight organosiloxane compositions that will not settle upon standing, and a method for preparing these compositions.

A second objective of this invention is to provide multi-part moisture curable organosiloxane composition wherein the portion containing the crosslinking agent also contains a stable dispersion of a finely divided solid exhibiting a higher density than that of the organosiloxane compounds present in the composition.

Another objective is to provide a method for preparing organosiloxane compositions containing a dispersed form of a finely divided solid that does not settle during long term storage of the compositions.

SUMMARY OF THE INVENTION

A stable dispersion of a finely divided solid in a liquid organosiloxane composition exhibiting a lower density than the density of the solid can be prepared as a homogeneous thixotropic paste or gel by blending the solid with a finely divided, treated silica, a specified class of liquid diorganosiloxane/oxyalkylene copolymers and, as a diluent, at least one liquid organosiloxane oligomer having a density lower than the density of the pigment. The paste or gel converts to a flowable liquid when subjected to shearing forces. In preferred embodiments of the present compositions the dispersed solid is a pigment.

Other ingredients such as curable polyorganosiloxanes, crosslinking agents and curing catalysts can be subsequently blended with the present dispersions to form homogeneous curable, organosiloxane compositions that do not separate into liquid and solid phases upon standing.

DETAILED DESCRIPTION OF THE INVENTION

This invention provides an organosiloxane composition comprising a solid phase uniformly dispersed within a matrix phase, wherein the solid phase comprises A) a finely divided material other than silica exhibiting a density greater than the density of said matrix phase; and B) a finely divided fume type reinforcing silica, and said matrix phase comprises C) a liquid organosiloxane copolymer exhibiting a general formula selected from the group consisting of

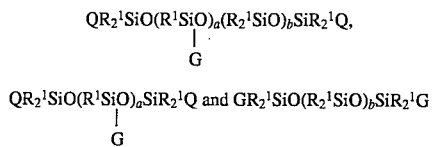

wherein each $R^1$ is individually selected from the group consisting of unsubstituted and substituted monovalent hydrocarbon radicals, Q is $R^1$ or G, G is a polyoxyalkylene group having an average structure selected from the group consisting of

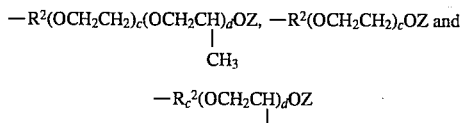

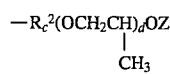

wherein $R^2$ represents a divalent hydrocarbon radical containing from 2 to 20 carbon atoms; Z is selected from the group consisting of hydrogen, alkyl radicals containing from 1 to 4 carbon atoms and the —(O)CR group, wherein R is selected from the group consisting of monovalent hydrocarbon radicals and monovalent hydrocarbon radicals containing the —C(O)OH group as a substituent; a, b, c and d are individually selected from positive integers; and D) a liquid organosiloxane oligomer that does not react with the ingredients in said dispersion and is compatible with said organosiloxane copolymer, wherein the silicon-bonded hydrocarbon radicals present in said oligomer are selected from the group consisting of monovalent unsubstituted and substituted hydrocarbon radicals; and the molecular weight of said oligomer is sufficient to solubilize said organosiloxane copolymer in said matrix phase;

wherein said silica constitutes from 2 to 15 weight percent, said copolymer constitutes from 0.1 to 10 weight percent, the concentrations of said silica and said copolymer are based on the combined weights of said finely divided solid, silica, organosiloxane copolymer and organosiloxane oligomer, and wherein the consistency of said composition at 25° C. is selected from the group consisting of liquids, pastes and gels, and said composition is flowable when subjected to shear.

Depending upon the diameter and contour of the silica particles and the concentration of this ingredient, the present compositions can be a liquid, paste or gel. As used in this specification, the terms "paste" and "gel" describe the consistency of the present compositions at 25° C. in the absence of shearing forces. Some of these compositions flow slowly if at all under their own weight, and all convert to flowable liquids when subjected to shearing forces.

In preferred pastes or gels the shearing forces generated by manually stirring the composition are sufficient to achieve this conversion.

Some of the present compositions are in the form of flowable liquids wherein the solid materials, including silica, remain dispersed in the matrix for at least seven days.

The stability of the present dispersions is typically determined by noting the time required for the solid materials to precipitate after the composition has been sufficiently blended to uniformly disperse the solid materials throughout the composition. The dispersion is considered stable if no settling of solid material is apparent seven days after the composition has been blended and allowed to remain undisturbed.

The Organosiloxane/Oxyalkylene Copolymer (Ingredient C)

An interaction between the organosiloxane/oxyalkylene copolymer, referred to hereinafter as ingredient C, and the finely divided fume silica, referred to hereinafter as ingredient B, is believed responsible for formation of the thixotropic matrix in which the finely divided silica and other solid materials are dispersed.

The organosiloxane/oxyalkylene copolymers suitable for use as ingredient C can be represented by a general formula selected from the group consisting of

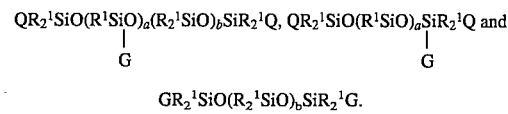

$GR_2^1SiO(R_2^1SiO)_bSiR_2^1G.$

In these formulae each $R^1$ is individually selected from the group consisting of unsubstituted and substituted monovalent hydrocarbon radicals, Q is $R^1$ or G, G is a polyoxyalkylene group having an average structure selected from the group consisting of

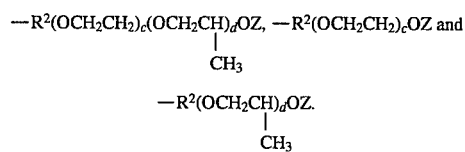

In these formulae $R^2$ represents a divalent hydrocarbon radical containing from 2 to 20 carbon atoms, Z is selected from the group consisting of hydrogen, alkyl radicals containing from 1 to 4 carbon atoms, —(O)CR groups wherein R is selected from the group consisting of unsubstituted monovalent hydrocarbon radicals and monovalent hydrocarbon radicals containing a —C(O)OH group as a substituent; a and b are individually selected from positive integers; and c and d are individually selected from positive integers. R preferably contains from 1 to 20 carbon atoms.

$R^2$ preferably contains from 3 to about 6 atoms, the positive integers represented by a and b are preferably from 1 to 100, preferably from 1 to 10, inclusive; and the positive integers represented by c and d are preferably from 1 to 20. $R^2$ is most preferably propylene, based on the availability of the corresponding allyl-terminated polyethers used to prepare the copolymer.

The monovalent hydrocarbon radicals represented by $R^1$ that are bonded to the silicon atoms of ingredient A can contain from 1 to 12 or more carbon atoms. $R^1$ can be alkyl, including but not limited to methyl, ethyl, propyl, butyl and octyl; cycloalkyl, including by not limited to cyclopentyl and cyclohexyl; aryl, including phenyl, naphthyl, benzyl and tolyl.

When atoms other than carbon and hydrogen are present on the hydrocarbon radicals represented by $R^1$ and $R^2$, these substituents can be any that will not react with the other ingredients of the present dispersions, adversely affect the stability of dispersions or interact with ingredients that the dispersions subsequently come in contact with. Preferred substituents are halogen atoms such as chlorine, bromine and fluorine. Preferred substituted hydrocarbon radicals include chloromethyl, 3-chloropropyl and 3,3,3-trifluoropropyl.

Preferably all of the hydrocarbon radicals represented by $R^1$ are alkyl radicals containing from 1 to 4 carbon atoms. Most preferably all of these hydrocarbon radicals are methyl, based on the availability of the copolymers and the compatibility of the copolymers with the diluents of the present compositions, referred to hereinafter as ingredient A.

The factors determining the selection of the values for a, b, c and d are 1) the level of thixotropic properties to be imparted to the pigment dispersion by the copolymer, 2) the ability of the copolymer to be solubilized by the particular diluent selected, and 3) the requirement that the copolymer be a liquid at the use temperature of the composition, which can be as low as 0° C.

The copolymers suitable for use in the present compositions can be prepared by reacting 1) an organohydrogensiloxane with concentrations of diorganosiloxane ($R^1_2SiO$) and organohydrogensiloxane ($R^1HSiO$) units corresponding to the values for a and b in the preceding formulae and 2) at least one polyether corresponding to one of the following general formulae:

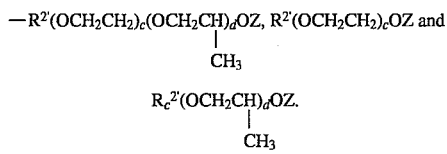

In these formulae $R^{2'}$ represents a terminally unsaturated alkenyl radical containing the same number and configuration of carbon atoms as $R^2$. For example, when $R^2$ is $—CH_2CH_2CH_2—$, $R^{2'}$ is $CH_2=CHCH_2—$.

The copolymer is typically isolated as a solution in the polyether used to prepare the copolymer, and can be used in this form to prepare the dispersions of the present invention.

The diluent in the present compositions, referred to as ingredient D, is a liquid organosiloxane oligomer containing at least one siloxane unit per molecule. The diluent will be discussed in detail in the following section of this specification.

To achieve the desired level of thixotropy the organosiloxane/oxyalkylene copolymer (ingredient C) should constitute from 0.1 to about 10 weight percent of the combined weight of ingredients A, B, C and D. The concentration of preferred copolymers is typically from 0.5 to 4 weight percent.

The present inventors have determined that the solubility of a given copolymer suitable for use as ingredient C in a diluent appears to be inversely proportional to 1) the molecular weight of the organosiloxane portion of the copolymer, which is, in turn, directly proportional to the sum of a and b, and 2) the number of oxyethylene and oxypropylene units in the copolymer, represented by a and b respectively.

The Fume Type Reinforcing Silica (Ingredient B)

Most of the commercially available types of fume silica with surface areas greater than about 250 $m^2$/gram are suitable for use in the present compositions. The average diameter of the particles preferably is less than one micron, most preferably less than 100 nanometers. Fume silicas are typically in the form of agglomerates that can are separated into aggregated particles during blending with the liquid ingredients of the present compositions.

To facilitate preparation of the present dispersions, a portion, preferably up to about 50 percent, of the silanol groups initially present on the silica should be reacted to form trihydrocarbylsiloxy groups. It appears that at least about half of the silanol groups initially present on the silica are necessary to provide the degree of thioxotropy that will maintain the silica and other solid materials as a stable dispersion.

The organosilicon compound that is reacted with the silanol groups present on the silica to form trihydrocarbylsiloxy groups can be a silane of the general formula $R^3_3SiX$ or a compound of the formula $(R^3_3Si)_2NH$. In these formulae each $R^3$ is individually selected from the group consisting of monovalent hydrocarbon radicals and X is a hydrolyzable group such as alkoxy.

The silica treating agent is preferably a hexaorganodisilazane wherein each of the substituents represented by $R^3$ is lower alkyl, most preferably methyl.

To obtain a matrix phase exhibiting the desired consistency and thixotropic character the concentration of fume silica is from 2 to about 15 weight percent, preferably from 5 to 10 weight percent, based on the total weight of the present dispersions.

The Organosiloxane Diluent (Ingredient D)

The diluent in the present pigment dispersions is an organosiloxane oligomer that is a liquid at 25° C. and contains at least two siloxane units per molecule.

The type of monovalent hydrocarbon radicals bonded to the silicon atoms of the diluent is not critical so long as the diluent is miscible with the organosiloxane/oxyalkylene copolymer, ingredient C. The hydrocarbon radicals present in the diluent, also referred to hereinafter as ingredient D, are one or more of alkyl containing from 1 to about 8 carbon atoms, alkenyl, cycloalkyl, aryl such as phenyl, aralkyl such as beta-phenylethyl and alkaryl such as tolyl or xylyl. These hydrocarbon radicals can contain substituents such as halogen atoms that will not interfere with the stability of the present dispersions.

Preferred embodiments of ingredient D include 1) cyclic and linear oligomers containing dimethylsiloxane, phenylalkylsiloxane and/or (phenylalkyl)alkylsiloxane units and 2) linear oligomers comprising at least one phenylsilsesquioxane unit and trialkylsiloxane units.

The present inventors discovered that diluents wherein at least 50 percent of the silicon atoms contain a phenyl or other aromatic hydrocarbon radical are more compatible with preferred organosiloxane/oxyalkylene copolymers used as ingredient C, and yield dispersions of fume silica that are optically clear. Organosiloxane oligomers wherein all of the silicon-bonded hydrocarbon radicals are alkyl such as methyl appear to be less compatible with the organosiloxane/oxyalkylene copolymer (ingredient C), and the dispersions formed by adding fumed silica to a mixture of these ingredients are typically cloudy.

When the siloxane units of ingredient D contain phenyl radicals, these units can be represented by the formula $R^4_ePh_f(C_gH_{2g})SiO_{(4-e-f)/2}$, wherein Ph represents phenyl $R^4$ represents an alkyl radical containing from 1 to about 10 carbon atoms, e is 0, 1 or 2, e is 1 or 2, the sum of e and f does not exceed 3, and g is 0 or an integer from 1 to 4. $R^4$ preferably contains from 1 to 3 carbon atoms, is most preferably methyl and f is preferably 1.

Examples of suitable phenyl-containing siloxane units include but are not limited to methylphenylsiloxane units, methyl-beta-phenylethylsiloxane units, methyl-2-methyl-2-phenylethylsiloxane and phenylsilsesquioxane units.

When the siloxane units in ingredient C are arranged in a linear configuration, the two terminal triorganosiloxane units present in each molecule preferably contain three monovalent hydrocarbon radicals bonded to the silicon atom. These hydrocarbon radicals can be all alkyl, such as methyl, or a combination of two alkyl and one phenyl radical.

Because the compatibility of the diluent with the thixotropic agent typically decreases with increasing molecular weight of the diluent, the diluent should contain no more than an average of about 30 repeating units, preferably no more than about 10 repeating units per molecule. To achieve optically clarity it appears that at least 20 percent of the siloxane units in the diluent should be phenylsiloxane units.

To ensure solubility of the higher molecular weight thixotropic agents that may either be required or be the only ones available, when the oligomer(s) used as ingredient D contain silicon-bonded phenyl radicals, the oligomer should have the lowest possible molecular weight commensurate with the cost and availability of the diluent.

If cost and availability were not considerations, cyclic dialkylsiloxanes such as dimethylsiloxanes and methylphenylsiloxanes would be the preferred diluents, particularly for higher molecular weight thixotropic agents, followed by trimethylsiloxy-terminated dimethylsiloxane and polymethylphenylsiloxanes and linear oligomers containing trimethylsiloxy and either methylsilsesquioxane or phenylsilsesquioxane units.

Conversely, if only higher molecular weight oligomers are available, this limits the choice of organosiloxane/oxyalkylene copolymers (ingredient A) to those containing an average of fewer than about 10 organosiloxane units per molecule.

It should be apparent from this discussion that solubility of the organosiloxane/oxyalkylene copolymer (ingredient C) in the diluent is maximized by using the lowest molecular weight embodiment of ingredient C that will provide the desired level of thixotropy and by minimizing the molecular weight of the diluent.

The diluent can constitute from 10 to about 90 weight percent of the matrix phase of the present compositions.

The Finely Divided Solid (Ingredient A)

Any commercially available finely divided solid with a density greater than the combined densities of the organosiloxane/oxyalkylene copolymer (ingredient C) and the diluent (ingredient D) can be dispersed in the present compositions, so long as the solid does not contain groups that react with these ingredients or any of the additional ingredients present when the dispersion is incorporated into other compositions such as curable organosiloxane compositions, a preferred end-use application for the present dispersions.

The types of solid materials that can be blended with ingredients B, C and D to form the present thixotropic dispersions include but are not limited to metals such as magnesium, titanium, tin, zinc, iron and copper; oxides and other compounds of these metals; compounds of metals such as calcium, barium, lead, sodium, potassium, cerium and antimony and compounds of non-metallic elements such as phosphorus and sulfur. Preferred solids are pigments that are used to impart color to compositions varying in consistency from liquids to gels to gums.

The finely divided solid typically constitutes from 0.1 to about 50 weight percent or more of the total dispersion, preferably from 1 to about 10 weight percent.

When the finely divided solid is a pigment, the relative concentration of this ingredient will depend upon the upon the shade and intensity of the color desired in the final article. This concentration is typically from 0.1 to about 5 weight percent, based on the combined weight of ingredients B, C and D.

The maximum particle size of the solid material will be dependent at least in part on the density of the material, the viscosity of the matrix under no-shear conditions and how rapidly this viscosity is achieved after the solid has been initially dispersed in the composition. The particle size of solid materials other than the fume silica preferably less than about 1 mm.

Preparation of Dispersions

The thixotropic dispersions of the present invention can be prepared by blending the desired amounts of the organosiloxane/oxyalkylene copolymer, fume silica and diluent to homogeneity. The pigment or other finely divided solid forming the major portion of the dispersed solid phase is preferably included together with these ingredients, however it can be added at a later time without any adverse effect on the stability of the final dispersion.

Irrespective of whether or not the finely divided solid is present, the initial mixture of ingredients A, B, C and D is a relatively thin liquid. If left undisturbed some of the present compositions will increase slightly in viscosity and remain flowable while others gradually thicken to the consistency of a flowable or non-flowable, gelatinous paste or gel within about 15 minutes under ambient conditions (25° C. and atmospheric pressure) if allowed to remain undisturbed.

When subjected to shear by moderate to vigorous stirring the pastes and gels are converted to flowable liquids that revert to their non-flowable state when stirring is discontinued. The period required for this reversion can vary from several minutes 24 hours or longer.

A preferred end use application for the stable dispersions is in curable organosiloxane compositions to impart color or other property such as flame retardancy or heat stability to these compositions, depending upon the types of solid materials present other than fume silica that are present in the solid phase of the dispersion.

When the present dispersions are used as ingredients in curable organosiloxane compositions, the ingredients present in the curable compositions are not critical, so long as none of these ingredients interfere with the stability of the present dispersions and the presence of the dispersion does not inhibit curing of the organosiloxane composition.

The present dispersions are particularly useful as pigment vehicles that impart a uniform color to curable organosiloxane compositions. One type of organosiloxane composition cures in the presence of moisture and contains a polyorganosiloxane with at least two silanol groups per molecule, an organosilicon compound containing at least three alkoxy or other hydrolyzable groups per molecule as a crosslinking agent and a catalyst for the reaction of these ingredients.

The ingredients of preferred moisture curable organosiloxane compositions are described in detail in the following section of this specification.

The Curable Polyorganosiloxane (Ingredient E)

One type of curable organosiloxane composition cures in the presence of moisture by the reaction of a liquid polyorganosiloxane containing at least two silanol groups per molecule with an organosilicon compound containing at least three silicon-bonded alkoxy or other hydrolyzable groups per molecule. The compositions typically include a catalyst for the crosslinking reaction.

The polyorganosiloxanes referred to in this specification as ingredient E contain at least two silanol groups per molecule and can exhibit a linear or branched structure. The polyorganosiloxanes are liquids at 25° C.

The repeating units of ingredient E can be represented by the general formula $R^5_j SiO_{4-j/2}$, where $R^5$ represents an unsubstituted or substituted monovalent hydrocarbon radical and j is 1 or 2. When j is 2 the hydrocarbon radicals represented by $R^5$ can be identical or different. This ingredient can contain one, two or more different types of repeating units.

Monovalent hydrocarbon radicals that can be represented by $R^5$ include alkyl radicals containing from 1 to 12 or more carbon atoms, substituted alkyl such as chloromethyl and 3,3,3-trifluoropropyl, aryl radicals such as phenyl and naphthyl, alkaryl radicals such as tolyl and xylyl and aralkyl radicals such as benzyl. Preferred radicals are alkyl such as methyl and ethyl, phenyl, and 3,3,3-trifluoropropyl. Substituents other than halogen atoms can be present so long as these do not adversely affect curing of the organosiloxane composition or stability of the present dispersions.

Most preferably j in the foregoing general formula is 2 and at least one of the $R^5$ groups on each silicon atom is a methyl radical.

To achieve a useful level of tensile strength and other physical properties in the cured material the number average molecular weight of ingredient E should be at least 20,000, preferably from 25,000 to 75,000. The viscosity of polyorganosiloxanes with number average molecular weights above about 100,000 are typically too viscous for convenient processing, particularly blending with the other ingredients of the present compositions using conventional mixing equipment.

The Crosslinking Agent (Ingredient F)

Crosslinking agents for the polyorganosiloxanes referred to as ingredient E of the present moisture curable compositions are typically organosilicon compounds containing an average of at least three silicon-bonded hydrolyzable groups per molecule. Preferred hydrolyzable groups are alkoxy containing from 1 to about 4 carbon atoms, carboxy containing from 2 to 4 carbon atoms and ketoximo such as methylethylketoximo.

The curing agent, referred to hereinafter as ingredient F, can be a silane, disiloxane or a polyorganosiloxane. Silanes are generally preferred, based on their cost and availability. Preferred silanes include but are not limited to methyltrimethoxysilane, phenyl trimethoxysilane, vinyl trimethoxysilane, methyltriethoxysilane, methyltriacetoxysilane, methyltri(methylethylketoximo)silane, alkyl orthosilicates such as tetraethyl orthosilicate and condensation products of these orthosilicates, which are typically referred to as alkyl polysilicates.

The concentration of curing agent should be sufficient to convert the composition to an elastomeric or resinous material exhibiting the desired physical properties in the presence of moisture. Typical moisture curable compositions contain from 0.5 to 6 weight percent of alkoxy or other hydrolyzable group based on the total weight of the curable composition.

The Curing Catalyst (Ingredient G)

In addition to the crosslinkable polyorganosiloxane and curing agent, the curable composition includes a catalyst for the crosslinking reaction. Examples of suitable catalysts include but are not limited to compounds of titanium, aluminum, zirconium, lead and tin. These catalysts promote hydrolysis of the hydrolyzable groups present on the crosslinking agent in the moisture. Preferred catalysts for use with the present compositions when used for moldmaking include divalent tin salts of carboxylic acids such as stannous acetate and stannous octoate and organotin compounds such as dimethyltin dineodecanoate, dibutyltin diacetate, dibutyltin dilaurate and dioctyltin diacetate. The carboxylic acid portion of these tin compounds contain from 1 to 20 carbon atoms.

The concentration of crosslinking catalyst appears critical to achieving a useful cure rate following the inhibition period resulting from the presence of the working time extender. In preferred curable compositions of the present invention the concentration of catalyst is from 0.5 to about 5 weight percent, based on the weight of the crosslinkable polyorganosiloxane (ingredient E).

Optional Ingredients
Fillers

Curable organosiloxane compositions containing a thixotropic dispersion of this invention can optionally contain one or more of the reinforcing and non-reinforcing type fillers conventionally used in curable organosiloxane compositions.

Examples of suitable fillers include but are not limited to reinforcing fillers such as finely divided silica of the fume or precipitated type, and non-reinforcing fillers such as alumina, titanium dioxide, silicates such as zirconium silicate, and calcium carbonate.

The filler or combination of fillers typically constitutes from 5 to 40 percent, preferably from 10 to about 30 percent of the weight of the base portion of the preferred two part organosiloxane compositions.

For some fillers, particularly, reinforcing fillers such as silica, treatment of the filler to react a portion of the hydroxyl groups present on the surface of the filler particles may be desirable to prevent a phenomenon referred to in the art as "creping" or "crepe hardening". Useful filler treating agents are described in a preceding section of this specification, and include but are not limited to silanol-terminated low molecular weight polydiorganosiloxanes and hexaalkyl disilazanes.

The filler can be treated prior to being blended with the other ingredients of the curable organosiloxane composition or the treating agent can be combined with these ingredients to treat the filler in situ.

Additional optional ingredients can be added to modify the properties of the curable organosiloxane composition or cured materials prepared using this composition. These additional ingredients include but are not limited to liquid diluents in addition to the organosilicon oligomers referred to as ingredient F, water to accelerate curing, stabilizers to inhibit degradation in the presence of heat and/or ultraviolet light, anti-oxidants, dyes and flame retardants.

Preparation and Curing of Curable Compositions

Preferred two-part curable compositions containing the stabilized dispersed finely divided solid materials of this invention are prepared by blending the base portion of the composition with the portion containing the crosslinking agent and ingredients A–D. Crosslinking or curing of the composition begins when ingredients E, F and G are present together with water present in the atmosphere an/or as an ingredient of the organosiloxane composition, and requires from several minutes to several hours, depending upon the amount of water present, the temperature, and the type and concentration of crosslinking catalyst and working time extender.

When the hydrolyzable groups present in the crosslinking agent are alkoxy groups and the crosslinking catalyst is a tin compound the curable organosiloxane composition is preferably packaged in two parts. Ingredients A–D of the present dispersions are included with the crosslinking agent and the catalyst for the crosslinking reaction in one part that is substantially free of hydroxyl compounds to avoid premature reaction of the crosslinking agent. The curable polyorganosiloxane, referred to in the present specification as ingredient E, together with any reinforcing or non-reinforcing fillers and other optional ingredients are located in a second part, referred to as the base portion of the composition.

In an alternative embodiment a thixotropic dispersion of the present invention containing one or more pigments as the dispersed phase is packaged as a third component, separate from the base portion and the portion containing the curing agent and catalyst. This allows the user of the composition to vary the shade and intensity of color by selecting the appropriate type and amount of dispersed pigment without affecting the concentration of crosslinking agent and crosslinking catalyst, which would affect the physical properties of cured materials prepared using the present compositions.

When the present dispersions containing fume silica and at least one additional finely divided solid material are blended into the portion of two-part organosiloxane compositions containing the crosslinking agent and a catalyst for the crosslinking reaction, the ability of a given diluent to dissolve the organosiloxane/oxyalkylene copolymer (ingredient C) together with the crosslinking agent and catalyst for the crosslinking reaction appears directly proportional to the molar ratio of the phenyl-containing siloxane units to other siloxane units in the molecules of diluent (ingredient D) and inversely proportional to the molecular weight of the diluent.

Cured organosiloxane elastomers prepared using the thixotropic dispersions and curable compositions described in the present specification are suitable for use in a variety of end use applications, including sealants, coating materials and as pottants or encapsulants for electrical and electronic devices. The compositions are particularly useful for preparing molds by applying the composition onto the surface of a master to be replicated. The contour of the master corresponds to the shape of the particles to be prepared using the mold. The shaped articles are prepared by pouring a curable composition into the mold, allowing the ingredients of the composition to react an form a solid, crosslinked material, and then stripping the mold away from the resultant shaped article.

EXAMPLES

The following examples describe preferred thixotropic dispersions and curable organosiloxane compositions suitable for use with these dispersions. The examples should not be interpreted as limiting the invention defined in the accompanying claims. Unless otherwise indicated all parts and percentages in the examples are by weight and viscosities are the values measured at 25° C.

Example 1

This example describes preparation of a preferred pigment dispersion.

A thixotropic pigment dispersion was prepared by blending the following ingredients to homogeneity: as the diluent, 94 parts of a mixture containing 18 weight percent of tris(trimethylsiloxy)phenylsilane, 48 weight percent of $[(Me_3SiO)_2PhSi]_2O$ and 34 weight percent of $(Me_3SiO)_2PhSiOSiPh(OSiMe_3)OSiPh(OSiMe_3)_2$, referred to hereinafter as ingredient C1; 6 parts of a fume silica that had been previously treated with hexamethyldisilazane; 2 parts of a dimethylsiloxane/oxyethylene copolymer of the formula

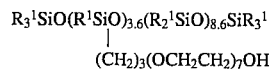

as an 85 weight percent solution in $CH_2=CHCH_2(OCH_2CH_2)_7OH$ and 1 part each of Irgalite Red, a pigment manufactured by Ciba Geigy, and Heliogen Blue, a pigment manufactured by BASF.

The initial mixture was a liquid that formed a gelatinous paste within 15 minutes. The paste was converted to a flowable liquid by stirring it for several seconds with a metal spatula. There was no noticeable separation of pigment when the dispersion was allowed to remain undisturbed for 30 days.

As a comparative example, a dispersion was prepared by blending to homogeneity the amounts of ingredient C1, silica and pigments described in the preceding section of this example. The resultant mixture was a viscous liquid that did not appear to thicken over 24 hours, at which time no appreciable amount of pigment appeared to be present on the bottom of the container. Most of the pigment settled to the bottom of the container when the composition was allowed to remain undisturbed for 30 days.

Example 2

To determine the effect on the stability of a dispersion of the present invention of adding conventional crosslinking agents and catalysts for moisture curable organosiloxane compositions, 10 parts of ethyl polysilicate were added to a dispersion prepared by blending to homogeneity the types and amounts of organosiloxane/oxyethylene copolymer and silica described in Example 1 in this specification together with 94 parts of the diluent referred to as ingredient C1 in Example 1.

The initially flowable liquid thickened to form a gelatinous paste when it was allowed to remain undisturbed for 15 minutes. The same thickening effect was observed when 10 parts of n-propyl orthosilicate were used in place of the ethyl polysilicate.

Example 3

This example demonstrates the effect of varying the type and concentration of organosiloxane/oxyalkylene copolymer, silica and diluent on the type of dispersion containing the silica as the dispersed solid phase.

The various ingredients used are identified in Table 2 as follows:

Silica (Ingredient B):

B1—a fume silica wherein about 50 percent of silanol groups are endblocked with trimethylsiloxy groups, the median particle size is 7 nanometers, and the surface area was 260 m²/g. The degree of surface structuring, i.e. contour variation, is relatively high.

B2—a fume silica wherein about 50 percent of silanol groups are endblocked with trimethylsiloxy groups, and the surface area is 130 m²/g. The degree of surface structuring is lower than B1.

B3 (comparative example)—a precipitated silica wherein about 50 percent of the silanol groups are endblocked with trimethylsiloxy groups, the median particle size is 11 microns, and the surface area is 200 m²/g. The degree of surface structuring is considerably lower than either B1 or B2.

Organosiloxane/oxyalkylene Copolymers (Ingredient C)
$(CH_3)_3SiO[Si(CH_3)_2SiO]_x[Si(A)(CH_3)O]_ySi(CH_3)_3$ $A\!=\!\!-CH\!=\!CHCH_2(OCH_2CH_2)_m[OCH_2CH(CH_3)]_nX$

TABLE 1

|    | x   | y    | m  | n  | X        | Concentration[1] (Wt. %) |
|----|-----|------|----|----|----------|--------------------------|
| C1 | 8.8 | 3.6  | 7  | 0  | OH       | 85                       |
| C2 | 8.8 | 3.6  | 12 | 0  | OH       | 83                       |
| C3 | 8.8 | 3.6  | 12 | 0  | OH       | 88                       |
| C4 | 0   | 1    | 7  | 0  | OC(O)CH₃ | 89                       |
| C5 | 100 | 9.5  | 18 | 18 | OH       | 57                       |
| C6 | 0   | 48[2]| 2  | 2  | DSD[3]   | 70                       |

[1]Concentration of the copolymer in the corresponding polyether(s) used to prepare the copolymer
[2]The oxyalkylene groups in C6 are derived from a mixture containing 95 mole percent of the allyl ether of a polyethylene glycol containing an average of 12 oxyethylene units per molecule and 5 mole percent of the allyl ether of a copolymer containing an average of 18 oxyethylene units and 18 oxypropylene units per molecule. The average molecule contained 48 non-terminal siloxane units of the formula $-Si(CH_3)(A)O-$.
[3]DSD = dodecenylsuccinic dicarboxylate

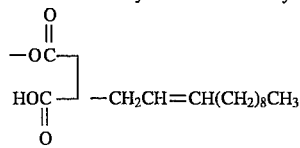

The Diluent (ingredient D)

D1—A mixture containing 18 weight percent (25 mole percent) of tris(trimethylsiloxy)phenylsilane; 48 percent by weight (50 mole percent) of [(CH₃)₃SiO]₂PhSiOSiPh[OSi(CH₃)₃]₂; and 34 weight percent (25 mole percent) of [(CH₃)₃SiO]₂PhSiOSiPh[OSi(CH₃)₃]OSiPh[OSi(CH₃)₃]₂

D2—A trimethylsiloxy-terminated polydimethylsiloxane exhibiting a viscosity of 50 mm2/sec.

D3—A trimethylsiloxy-terminated polydimethylsiloxane exhibiting a viscosity of 350 mm2/sec.

D4—A trimethylsiloxy-terminated polydimethylsiloxane exhibiting a viscosity of 500 mm2/sec.

D5—a dimethylvinylsiloxy-terminated polydimethylsiloxane having a viscosity of about 0.4 Pa.s at 25° C.

TABLE 2

| Ingredient (Wt. %) | Sample No. | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| Diluent | | | | | | | | | | | | | | | | | |
| D1 | | | | 92 | | 92 | 92 | 92 | 92 | 92 | 92 | 92 | 88 | 82 | 96 | 90 | 94 |
| D2 | 92 | | | | | | | | | | | | | | | | |
| D3 | | 92 | | | | | | | | | | | | | | | |
| D4 | | | 92 | | | | | | | | | | | | | | |
| D5 | | | | | 92 | | | | | | | | | | | | |
| Silica | | | | | | | | | | | | | | | | | |
| B1 | 6 | 6 | 6 | 6 | 6 | | | 6 | 6 | 6 | 6 | 6 | 10 | 10 | 2 | 2 | 2 |
| B2 | | | | | | 6 | | | | | | | | | | | |
| Comparison Copolymer[1] | | | | | | | 6 | | | | | | | | | | |
| C1 | 2 | 2 | 2 | 2 | 2 | 2 | 2 | | | | | | 2 | 8 | 2 | 8 | 1 |
| C2 | | | | | | | | 2 | | | | | | | | | |
| C3 | | | | | | | | | 2 | | | | | | | | |
| C4 | | | | | | | | | | 2 | | | | | | | |
| C5 | | | | | | | | | | | 2 | | | | | | |
| C6 | | | | | | | | | | | | 2 | | | | | |

1 = as a solution in the corresponding polyether (see Table 1)

The appearance of the dispersions are summarized in Table 3.

TABLE 3

| Sample No. | Appearance |
|---|---|
| 1 | Opaque flowable gel |
| 2 | Opaque gel, less flowable than sample 1 |
| 3 | Opaque gel, thicker and more less flowable than sample 2 |
| 4 | Clear gel, about as flowable as 1, entrapped bubbles |
| 5 | Opaque gel, similar to 3 |
| 6 | Hazy flowable liquid, no entrapped bubbles. silica completely dispersed |
| 7 | Liquid, silica settles to bottom of container, no entrapped bubbles. |
| 8 | Clear gel, flowability similar to sample 4, entrapped bubbles |
| 9 | Clear gel, similar to sample 8, entrapped bubbles |
| 10 | Very flowable, slightly viscous liquid, no entrapped bubbles |
| 11 | Clear flowable gel, similar to samples 8 and 9, but with more residue on wall of container, entrapped bubbles |
| 12 | Clear flowable gel, more flowable than sample 11, less residue on wall of container |
| 13 | Clear gel, very slightly flowable in absence of stirring |
| 14 | Cloudy gel, very slightly flowable in absence of stirring |
| 15 | Flowable liquid, less viscous than sample 10, no entrapped bubbles |
| 16 | Low viscosity liquid, solid gel at bottom of container could be redispersed by stirring, gel particles on wall of container |
| 17 | Clear flowable gel with entrapped bubbles |

Example 4

This example describes the preparation and curing of an organosiloxane composition containing a pigment dispersion of the present invention.

The base portion of a curable organosiloxane composition was prepared by blending the following ingredients to homogeneity:

42 parts of a silanol-terminated polydimethylsiloxane exhibiting a viscosity of 50 Pa.s;

21 parts of a trimethylsiloxy-terminated polydimethylsiloxane exhibiting a viscosity of 0.325 Pa.s;

3 parts of hexamethyldisilazane;

21 parts of a precipitated silica exhibiting an average particle size of 4 microns;

1 part of water;

11 parts of zirconium silicate exhibiting an average particle size of 5 microns;

42 parts of a silanol-terminated polydimethylsiloxane exhibiting a viscosity of 10 Pa.s;

0.8 part of an emulsion prepared by blending 35 parts of water, 60 parts of a liquid trimethylsiloxy-terminated polydimethylsiloxane exhibiting a viscosity of 0.35 Pa.s, 4 parts of a non-ionic surfactant, 2,6,8-trimethyl-4-nonyloxypolyethyleneoxyethanol, and 1 part of sodium polyethylene oxide octylphenoxy sulfonate.

A crosslinking agent/catalyst mixture was prepared by blending the following ingredients to homogeneity:

2 parts of the organosiloxane/oxyalkylene copolymer referred as C1 in Example 3;

67 parts of the diluent referred to as D1 in Example 3; and 4 parts of the silica identified as B1 in Example 3; and as pigments, 0.5 part each of Irgalite Red, a pigment manufactured by Ciba Geigy, and Heliogen Blue, a pigment manufactured by BASF.

The resulting mixture was blended to homogeneity with 10 parts of ethyl polysilicate and 8 parts of n-propyl orthosilicate as crosslinking agents; and as the curing catalyst 10 parts of dibutyltin dineodecanoate;

Curable compositions were prepared by adding 1 part of this pigmented crosslinking agent/catalyst mixture to 10 parts of the base portion of the composition.

The viscosity of the freshly-prepared composition was 55,000 Pa.s, measured using a Brookfield viscometer equipped with a number 6 spindle rotating at a speed of 10 revolutions per minute.

The curable composition was poured into a chase on the bed of a hydraulic press and allowed to cure for about 2 hours under ambient conditions and a pressure of about 9,000 p.s.i.g. (62 mpa).

The cured sheet of elastomer exhibited a tensile strength of 400 psi (2.8 mpa) an elongation at break of 456% and a hardness value of 20 on the shore A scale.

That which is claimed is:

1. An organosiloxane composition comprising a solid phase uniformly dispersed within a matrix phase, wherein the solid phase comprises A) a finely divided material other than silica exhibiting a density greater than the density of said matrix phase; and B) a finely divided fume reinforcing silica, and said matrix phase comprises C) a liquid organosiloxane copolymer exhibiting a general formula selected from the group consisting of

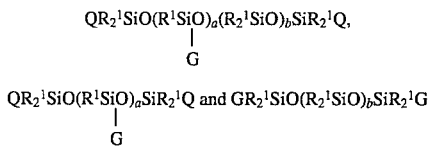

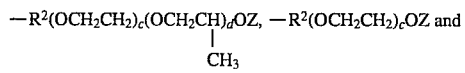

wherein each $R^1$ is individually selected from the group consisting of unsubstituted and substituted monovalent hydrocarbon radicals, Q is $R^1$ or G, G is a polyoxyalkylene group having an average structure selected from the group consisting of $-R^2(OCH_2CH_2)_c(OCH_2CH)_dOZ$, $-R^2(OCH_2CH_2)_cOZ$ and
$\phantom{-R^2(OCH_2CH_2)_c(OCH_2CH)_dOZ,\ -R^2(OCH_2CH_2)_cOZ\ an}$ $CH_3$

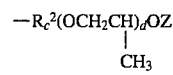

wherein $R^2$ represents a divalent hydrocarbon radical containing from 2 to 20 carbon atoms; Z is selected from the group consisting of hydrogen, alkyl radicals containing from 1 to 4 carbon atoms and the —(O)CR group, wherein R is selected from the group consisting of monovalent hydrocarbon radicals and monovalent hydrocarbon radicals containing the —C(O)OH group as a substituent; a, b, c and d are individually selected from positive integers; and D) a liquid organosiloxane oligomer that does not react with the ingredients in said dispersion and is compatible with said organosiloxane copolymer, wherein the silicon-bonded hydrocarbon radicals present in said oligomer are selected from the group consisting of monovalent unsubstituted and substituted hydrocarbon radicals; and the molecular weight of said oligomer is sufficient to solubilize said organosiloxane copolymer in said matrix phase;

wherein said silica constitutes from 2 to 15 weight percent, said copolymer constitutes from 0.1 to 10 weight percent, the concentrations of said silica and said copolymer are based on the combined weights of said finely divided material, silica, organosiloxane copolymer and organosiloxane oligomer, and wherein the consistency of said composition at 25° C. is selected from the group consisting of liquids, pastes and gels, and said composition is flowable when subjected to shear.

2. A composition according to claim 1 wherein $R^1$ represents an alkyl radical containing from 1 to 4 carbon atoms; $R^2$ represents an alkylene radical containing from 3 to 6 carbon atoms; the positive integers represented by a and b are from 1 to 100, inclusive; the positive integers represented by c and d are from 1 to 20, inclusive; Q is $R^1$; R contains from 1 to 20 carbon atoms; said organosiloxane copolymer constitutes from 0.5 to 4 percent of the combined weights of said finely divided solid material, silica, organosiloxane copolymer and organosiloxane oligomer; said organosiloxane oligomer constitutes from 10 to 90 weight percent of said matrix phase, contains no more than 30 siloxane units per molecule, where said units are represented by the average formula $R^4_ePh_f(C_gH_{2g})SiO$, wherein Ph represents phenyl, $R^4$ represents an alkyl radical containing from 1 to about 10 carbon atoms, e is 0, 1 or 2, e is 1 or 2, the sum of e and f does not exceed 3, and g is 0 or an integer from 1 to 4; and said finely divided solid constitutes from 0.1 to 10 weight percent of said composition.

3. A composition according to claim 2 wherein $R^1$ is methyl; $R^2$ is propylene, the positive integers represented by j and k are from 1 to 10, inclusive; said organosiloxane oligomer contains an average of not more than ten siloxane units per molecule and is selected from the group consisting of cyclic phenylalkylsiloxanes, cyclic diorganosiloxanes containing phenylalkylsiloxane and dialkylsiloxane units.

4. A composition according to claim 3 wherein said phenylalkylsiloxane units are phenylmethylsiloxane units and said dialkylsiloxane units are dimethylsiloxane units.

5. A composition according to claim 4 wherein said organosiloxane composition further comprises a curable polyorganosiloxane containing at least two silanol groups per molecule, a crosslinking agent for said curable polyorganosiloxane and a catalyst for the crosslinking reaction.

6. A composition according to claim 5 wherein the repeating units of said curable polyorganosiloxane are represented by the formula $R^5_j SiO_{(4-j)/2}$ wherein each $R^5$ is individually selected from monovalent unsubstituted or substituted hydrocarbon radicals and j is 1 or 2; the number average molecular weight of said polyorganosiloxane is from 25,000 to 75,000; said crosslinking agent is a silane containing at least three hydrolyzable groups per molecule selected from the group consisting of alkoxy containing from 1 to 4 carbon atoms, carboxy containing from 2 to 4 carbon atoms and ketoximo; and said catalyst is selected from the group consisting of compounds of titanium, aluminum, zirconium, lead and tin.

7. A composition according to claim 6 wherein $R^5$ is selected from the group consisting of alkyl radicals containing from 1 to 4 carbon atoms, phenyl and 3,3,3-trifluoropropyl; the number average molecular weight of said curable polyorganosiloxane is from 25,000 to 75,000; j is 2; said hydrolyzable group is alkoxy; and said curing agent constitutes from 0.5 to 6 weight percent of said composition.

8. A composition according to claim 6 wherein said catalyst is a tin compound and said composition is packaged in two containers, wherein the contents of the first container comprises said curable polyorganosiloxane and the contents of said second container comprises said crosslinking agent, said curing catalyst, said finely divided material, said fume silica, and said matrix phase, and wherein said second container is substantially free of compounds containing hydroxyl groups.

9. A composition according to claim 8 wherein said finely divided material is a pigment.

* * * * *